Patented Sept. 29, 1925.

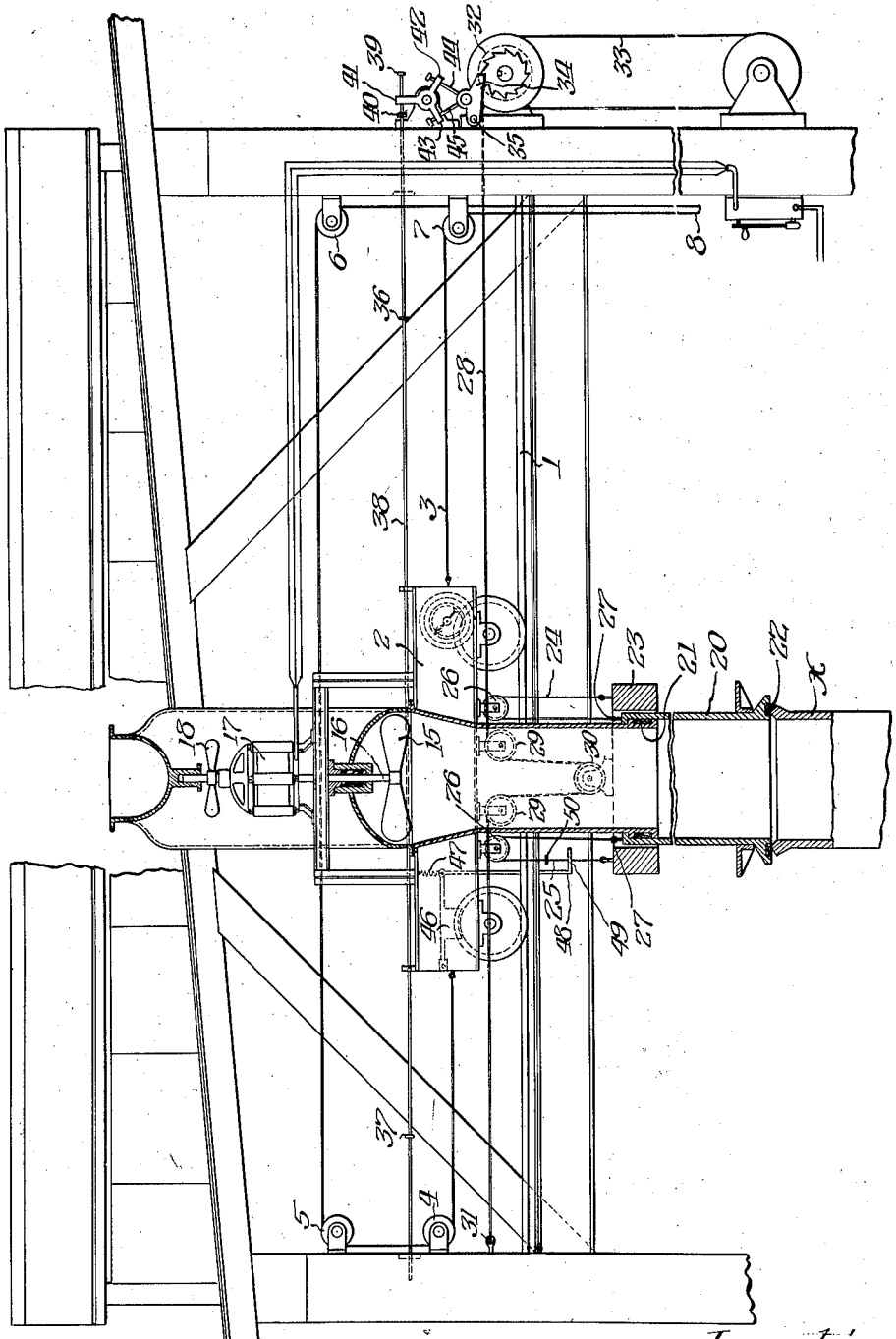

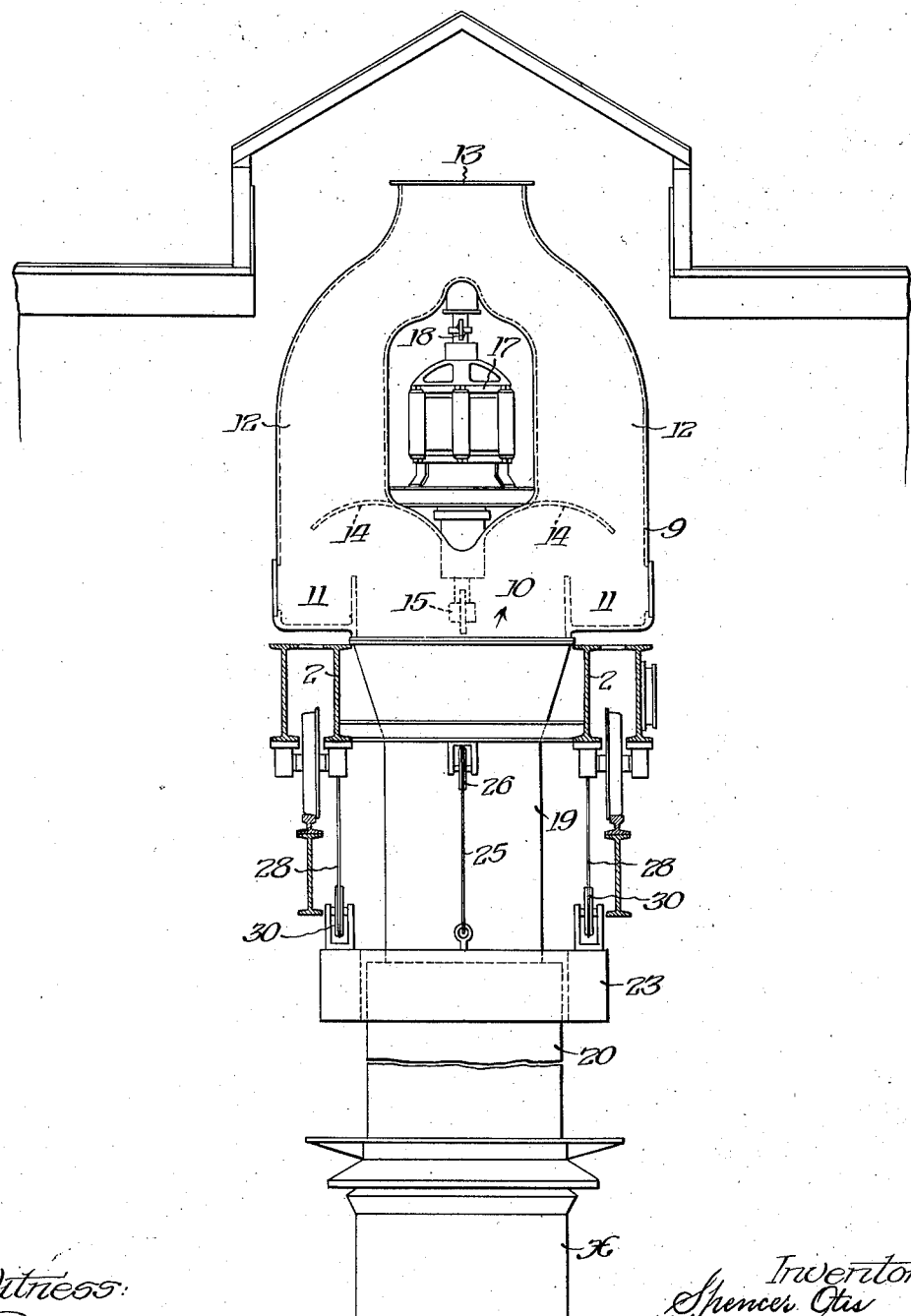

1,555,602

UNITED STATES PATENT OFFICE.

SPENCER OTIS, OF BARRINGTON, AND WALTER A. GARDNER, OF CHICAGO, ILLINOIS, ASSIGNORS, BY MESNE ASSIGNMENTS, TO NATIONAL BOILER WASHING COMPANY, OF CHICAGO, ILLINOIS, A CORPORATION OF MAINE.

SMOKE-DISPOSAL AND DRAFT-INDUCING APPARATUS FOR LOCOMOTIVES.

Application filed January 2, 1924. Serial No. 683,884.

*To all whom it may concern:*

Be it known that we, SPENCER OTIS and WALTER A. GARDNER, citizens of the United States, residing, respectively, at Barrington, in the county of Cook and State of Illinois, and at Chicago, in the county of Cook and State of Illinois, have jointly invented certain new and useful Improvements in Smoke-Disposal and Draft-Inducing Apparatus for Locomotives, of which the following is a specification.

This invention relates to apparatus for disposing of smoke from the smoke stacks of locomotives in roundhouses or other enclosed spaces, and in its preferred embodiment includes means for inducing a draft through the smoke stack for the purpose of promoting steam generation.

One object of the invention is to provide an apparatus of this general nature with means for trapping solid matter received from the locomotive stack; and, to this end, a trap is so related to an intake opening of the apparatus that it will receive solid matter precipitated from the smoke stack products; the preferred embodiment of this feature of the invention consisting in providing the smoke box with a bottom intake opening, a solid matter trap at the side of said opening, and a baffle for directing the discharged products laterally from the intake opening across the trap.

Another object is to provide an efficient apparatus operating upon the principle described; and, to this end, a further feature consists in locating a pair of solid matter traps on opposite sides of the intake opening of the smoke box, with baffles extending from an intermediate point over the intake opening laterally over the traps, and providing a pair of uptake flues over the traps into which the volatiles of the products escape.

Still another object is to provide means for inducing a draft through the smoke box; and, to this end, a further feature consists in locating a draft-inducing fan and motor in alignment with a funnel that is applied to the locomotive smoke stack, and by-passing the stack gases around the motor in a manner to leave the latter open to atmosphere, the fan having its shaft extended vertically upward therefrom to a motor being preferably arranged in a space between a pair of such by-passing flues.

Still another object is to provide means for establishing communication between the smoke box and the smoke stack, and to control such means from a remote point. Accordingly, another feature of the invention consists in providing a funnel movable relatively to the smoke box, preferably by telescopic action, and providing a connector leading from the remote point of control to said funnel; the preferred embodiment of this part of the invention also involving the feature of maintaining control of the funnel from the remote point while permitting freedom of travel of the funnel horizontally to bring it into position above a locomotive stack, as by mounting the smoke disposal apparatus upon a carriage; and this feature of the invention being realized by counterweighting the funnel to hold it normally raised, and providing a flexible connector to the counterweight leading from the remote point of control through and beyond the apparatus to a fixed point of attachment, so that the apparatus can traverse the controlling connector without impairing the control of the connector over the funnel.

Still another object of the invention is to provide means whereby the controlling connector for the funnel will be automatically released and the funnel raised by its counterweight upon the arrival of the apparatus in a position of disuse, and, to this end, a further feature of the invention consists in providing a detent for the funnel controlling connector, and a connector for releasing said detent which is encountered by the carriage as it reaches the aforesaid position of disuse; this detent-releasing connector being preferably in the form of a rod extending past the carriage in the direction of travel, and having stops encountered by the carriage when it reaches the aforesaid position at which it is desired to have the funnel raised.

In order that the invention may be fully understood, the preferred embodiment thereof is shown in the accompanying drawings, wherein—

Figure 1 is a side elevation of the apparatus; and

Figure 2 is an end elevation thereof, some of the parts in each figure being in section.

1 represents a track fixed at an upper level in a locomotive roundhouse, and 2 represents a carriage adapted to traverse said track and to be moved to any desired position thereon through means of a towing cable 3 connected to the respective ends of the carriage, and guided thence around the rollers 4, 5, 6, and 7 in order to present the end 8 of the cable within convenient reach for manipulation.

Mounted upon the carriage 2 is a smoke box 9, having a bottom intake opening 10 through which it is adapted to receive products discharged from a locomotive stack, such, for instance, as suggested at X. The smoke box 9 is preferably of twin construction and is provided with solid matter traps 11 located on opposite sides of its intake opening 10, and uptake flues 12 leading from spaces above said traps upwardly to a discharge mouth 13. Located in the upward path of products entering the opening 10 are baffles 14 extending from an intermediate point over the intake 10 laterally over the traps 11, and having such form as will give to products rising through opening 10, a direction made up of a sufficiently downward movement to insure precipitation of the heavier particles of solid matter before the products can escape into the uptake flue 12. Also located in intermediate position above the intake 10 is a draft inducing device, preferably in the form of a fan 15, the shaft 16 of which extends vertically upward to an electric motor 17 which is disposed in the open space between the uptake flues 12 where it can be protected from injurious effects of heat by natural circulation of air around it, which is preferably augmented by the action of a fan 17 on the other end of the motor shaft. Draft-inducing fan 15 will be of such capacity that it induces a forced draft through the locomotive and correspondingly assists in attaining a sufficient head of steam to permit the locomotive to move out of the roundhouse, thereby reducing the time of occupancy of roundhouse space by the locomotive.

In order to establish communication between smoke box 9 and the smoke stack X, a fixed pipe 19 depending from the smoke box has a funnel 20 telescopically connected with its lower end, the sliding connection between the funnel and pipe being preferably packed as at 21, and the funnel being provided with a packing 22 through which it may rest upon the smoke stack. Funnel 20 has its weight overbalanced by an annular weight 23 connected with the funnel by cables 24, 25, which pass over guide pulleys 26 and are attached to the funnel at 27. The arrangement is such that the weight 23 can raise the funnel 20 whenever the weight is not restrained from downward movement. To so restrain the weight or lower it as may be desired, flexible connectors 28 are passed over pulleys 29 on the carriage 2 and beneath pulleys 30 on the counterweight 23, and thence to fixed points of attachment 31, so that by shortening these flexible connectors 28 the counterweight 23 will be raised and the funnel 20 will be permitted to descend upon the smoke stack over which it has been brought by traversing the carriage, whereas release or slacking of the connector 28 will permit the counterweight 23 to descend and lift the funnel 20 from the smoke stack. In order to bring the flexible connectors 28 under control at a remote point of manipulation, said connectors are wound upon a drum 32 under control of an endless shipping rope 33. By driving the drum 32 in the winding direction, connectors 28 will be shortened, counterweight 23 will be raised, and funnel 20 will be permitted to descend upon the waiting smoke stack. Counterweight 23 will be held in an elevated position by means of the dog 34 pivoted at 35. When the locomotive is no longer in need of the service of the smoke disposal and draft-inducing apparatus, it moves out from beneath the funnel 20, leaving the latter in lowered position since the dog 34 prevents unwinding of the drum 32 to slacken the connectors 28. But before another locomotive is brought into position to receive the funnel upon its stack, the carriage 2 is drawn to one side or the other of the stall which the incoming locomotive is to occupy, and in so doing strikes against one or the other of the stops 36, 37 upon the controlling rod 38 and imparts a longitudinal movement to said rod which, with some lost motion, is transmitted through shoulders 39 and 40 to the rocker 41, whose arms 42, 43 are connected through lifting pins 44, 45, with the dog 34. By this means the arrival of the carriage 2 at either limit of its movement will release the drum 32 so that the connectors 28 will slacken under the load of the counterweight 23, and the funnel will be automatically raised to a position which will avoid encountering the smoke stack of a succeeding locomotive when the carriage is again moved to bring the funnel above the same. It will be understood that the relation of the connectors 28 to the counterweight is such that the apparatus can traverse these connectors in a direction longitudinal to the track 1 freely without changing the length of the connectors, and consequently without shifting the weight 23.

In order to maintain the carriage 2 at either limit of its movement at one side of a locomotive stall when not in use, a brake 46, suitably related to a wheel of the carriage and normally withdrawn by a spring 47, is adapted to be applied by a brake rod 48 whose end 49 is in the path of a projection 50 on the counterweight cable 25, so that whenever the weight is released and permitted to descend, the brake 46 is applied.

We claim:

1. In a smoke disposal apparatus for locomotives, a smoke box adapted to be brought into communication with the stack of a locomotive, a trap adapted to receive solid matter precipitated in said smoke box, and a baffle adapted to precipitate said solid matter.

2. In a smoke disposal apparatus, a smoke box adapted to be brought into communication with the stack of a locomotive and having an opening through which to receive products therefrom, a trap adapted to receive solid matter precipitated in said smoke box, a baffle adapted to deflect said products and cause such precipitation, and a fan located beneath said baffle and adapted to direct the products thereagainst.

3. In a smoke disposal apparatus, a smoke box having a bottom intake through which it is adapted to receive products discharged from a locomotive stack, a solid matter trap located to one side of said intake, a baffle overhanging said baffle and said trap, and a discharge passage leading from above said baffle.

4. In a smoke disposal apparatus for locomotives, a smoke box having a bottom intake through which it is adapted to receive products discharged from a stack, solid matter traps located on opposite sides of said intake opening, uptake flues extending laterally from said intake opening across said traps and thence upwardly therefrom, and baffles extending from an intermediate point above said intake laterally over said traps.

5. In a smoke disposal and draft inducing apparatus, a smoke box having a bottom intake through which it is adapted to receive products discharged from a locomotive stack, solid matter traps located on opposite sides of said intake opening, uptake flues extending from said intake opening laterally across said traps and thence upwardly therefrom, baffles extending from an intermediate point above said intake opening laterally over the traps, and means for inducing draft through said intake opening.

6. In a smoke disposal and draft inducing apparatus, a smoke box having a bottom intake through which it is adapted to receive products discharged from a locomotive stack, solid matter traps located on opposite sides of said intake opening, uptake flues extending from said intake opening laterally across said traps and thence upwardly therefrom, baffles extending from an intermediate point above said intake opening laterally over the traps, and means for inducing draft through said intake opening located beneath said baffles.

7. In a smoke disposal and draft inducing apparatus, a smoke box having a bottom intake through which it is adapted to receive products discharged from a locomotive stack, solid matter traps located on opposite sides of said intake opening, uptake flues extending from said intake opening laterally across said traps and thence upwardly therefrom, baffles extending from an intermediate point above said intake opening laterally over the traps, and means for inducing draft through said intake opening, comprising a fan centrally disposed over said intake opening and beneath said baffles.

8. In a smoke disposal and draft inducing apparatus, a smoke box having a bottom intake through which it is adapted to receive products discharged from a locomotive stack, solid matter traps located on opposite sides of said intake opening, uptake flues extending from said intake opening laterally across said traps and thence upwardly therefrom, baffles extending from an intermediate point above said intake opening laterally over the traps, and means for inducing draft through said intake opening comprising a fan centrally disposed over said intake opening and beneath said baffles, and a motor for driving said fan located coaxially with and above the fan, and between said uptake flues.

9. In a smoke disposal apparatus, a carriage, a funnel mounted on said carriage and movable relatively thereto to bring it into and out of communication with a smoke stack, guides mounted, respectively, on the carriage and funnel, a flexible connector leading from a point remote from the carriage and passing around said guides and passing beyond said carriage and immovably connected to a fixed point whereby it is adapted to impart movement to the funnel by changes in the length of said connector, but traversing said guides without moving the funnel during changes in the position of the carriage.

10. In a smoke disposal apparatus, a carriage, a brake for said carriage, a funnel mounted on said carriage with movement relatively thereto to bring it into and out of communication with a smoke stack, and means through which the funnel applies the brake to the carriage when the funnel is in a predetermined position on the carriage.

11. In a smoke disposal apparatus, a carriage, a brake for the carriage, a funnel movable on said carriage to bring it into and out of communication with the smoke stack, a counterbalance for said funnel, and means through which the counterbalance applies the brake to the carriage when the funnel is in a predetermined position.

12. In a smoke disposal apparatus, a carriage, a funnel movable on said carriage to bring it into and out of communication with a smoke stack, a flexible connector for normally restraining movement in the funnel, a detent for said connector, and means through which the carriage releases the detent upon attaining a predetermined position.

13. In a smoke disposal apparatus, a carriage, a funnel movable on said carriage to bring it into and out of communication with a smoke stack, a flexible connector for normally restraining movement in the funnel, a detent for said connector, and means through which the carriage releases said detent upon attaining a predetermined position; said last-named means comprising a connector controlling said detent and traversed by the carriage, and stops on said connector engaged by the carriage upon reaching a predetermined position.

14. In a smoke disposal and draft inducing apparatus, a funnel adapted to be applied to a locomotive smoke stack, and a draft inducing fan and motor for actuating the same in alignment with said funnel; said funnel having a flue for stack gases deflected to pass by the motor and leave the latter exposed to the cooling influence of atmosphere.

15. In apparatus for inducing draft in a locomotive stack and disposing of products therefrom, a pipe adapted to be applied to the locomotive stack, a fan and its motor in alignment with said pipe, and a pair of bypassed flues laterally disposed with relation to said fan, under the influence of said fan, and communicating with said pipe and leaving the motor open to the cooling influence of atmosphere.

16. In apparatus for inducing draft in locomotive stacks and disposing of products therefrom, a pipe adapted to communicate with a locomotive stack, a fan at the upper end of said pipe having its shaft in substantial alignment with the pipe, a motor in alignment with said shaft beyond the end of the pipe, and an upwardly extending flue communicating with the pipe adjacent to the fan and passing by the motor and leaving the later free to the cooling influence of atmosphere.

Signed at Chicago, Illinois this 5th day of December, 1923.

SPENCER OTIS.
WALTER A. GARDNER.